(12) United States Patent
Zhang et al.

(10) Patent No.: US 11,157,187 B2
(45) Date of Patent: Oct. 26, 2021

(54) METHOD, DEVICE, AND COMPUTER PROGRAM PRODUCT FOR OVERWRITING DATA

(71) Applicant: EMC IP Holding Company LLC, Hopkinton, MA (US)

(72) Inventors: Leihu Zhang, Beijing (CN); Chen Gong, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/885,788

(22) Filed: May 28, 2020

(65) Prior Publication Data

US 2021/0117090 A1    Apr. 22, 2021

(30) Foreign Application Priority Data

Oct. 21, 2019    (CN) .......................... 201911002580.7

(51) Int. Cl.
 *G06F 3/06* (2006.01)
(52) U.S. Cl.
 CPC ............ *G06F 3/064* (2013.01); *G06F 3/0608* (2013.01); *G06F 3/0613* (2013.01); *G06F 3/0653* (2013.01); *G06F 3/0659* (2013.01); *G06F 3/0673* (2013.01)

(58) Field of Classification Search
 CPC ...... G06F 3/0608; G06F 3/0613; G06F 3/064; G06F 3/0653; G06F 3/0659; G06F 3/0673
 See application file for complete search history.

(56) References Cited

U.S. PATENT DOCUMENTS

| 9,317,218 B1 | 4/2016 | Botelho et al. |
| 2015/0052393 A1* | 2/2015 | Palmer ................. G06F 11/108 714/15 |
| 2019/0205035 A1* | 7/2019 | Mizushima ........... G06F 3/0688 |
| 2019/0212949 A1* | 7/2019 | Pletka ................... G06F 3/0688 |

* cited by examiner

*Primary Examiner* — Larry T MacKall
(74) *Attorney, Agent, or Firm* — BainwoodHuang (57) ABSTRACT

Data overwriting techniques involve: comparing, based on a request for overwriting target data in a storage area to cover original data, a first compression ratio with a second compression ratio; in accordance with a determination that the first compression ratio is larger, compressing the target data into fragments at the first compression ratio; storing the fragments in segments in the storage area, the segments being previously used for storing corresponding fragments of the original data; and storing at least one padding data fragment in at least one free segment interleaved with the segments and/or free sectors in the segments. Accordingly, the overwritten data can be stored in the storage area in a continuous manner, while the write alignment requirement of the storage device can be satisfied, thereby saving the additional read overheads incurred by the write request and enhancing the write performance of the storage device.

20 Claims, 5 Drawing Sheets

METHOD, DEVICE, AND COMPUTER PROGRAM PRODUCT FOR OVERWRITING DATA

CROSS-REFERENCE TO RELATED APPLICATION

This application claims priority to Chinese Patent Application No. CN201911002580.7, on file at the China National Intellectual Property Administration (CNIPA), having a filing date of Oct. 21, 2019 and having "METHOD, DEVICE, AND COMPUTER PROGRAM PRODUCT FOR OVERWRITING DATA" as a title, the contents and teachings of which are herein incorporated by reference in their entirety.

FIELD

Embodiments of the present disclosure generally relate to the field of data storage, and in particular, to a method, an electronic device and a computer program product for overwriting data.

BACKGROUND

In order to save storage space occupied by data in a storage device, the data may be compressed at a certain compression ratio before being written in a storage area within the storage device. In the case where the data that are compressed at a certain compression ratio (e.g., Input/Output (I/O) instruction) are written into the storage area for the first time, the data are continuous in the storage area and subsequent data may be overwritten into the same storage area to override the original data.

The physical storage area may be divided, based on a memory management solution, such as the paging technique, into a plurality of segments of a page size. The page size is a minimum allocation unit of 4 KB or 8 KB. If the subsequent data have a compression ratio larger than the original data, the subsequent data usually are discontinuous in the same storage area and there are gaps between the subsequent data and the original data.

SUMMARY

Embodiments of the present disclosure provide a method, a device and a computer program product for overwriting data.

In a first aspect of the present disclosure, a method for overwriting data is provided. The method includes: comparing, based on a request of rewriting target data into a storage area to cover original data, a first compression ratio of the target data with a second compression ratio of the original data; when it is determined that the first compression ratio is larger than the second compression ratio, compressing the target data at the first compression ratio into a plurality of data fragments; storing the plurality of data fragments into a plurality of rewrite segments in the storage area, the plurality of rewrite segments being previously used for storing corresponding fragments of the original data; and storing at least one padding data fragment into at least one free sector interleaved with the plurality of rewrite segments and/or free sectors in the plurality of rewrite segments.

In a second aspect of the present disclosure, a device for storing data is provided. The device includes: at least one processing unit; at least one memory coupled to the at least one processing unit and stored with instructions executed by the at least one processing unit, wherein the instructions, when executed by the at least one processing unit, cause the device to perform acts consisting of: comparing, based on a request of rewriting target data into a storage area to cover original data, a first compression ratio of the target data with a second compression ratio of the original data; in accordance with a determination that the first compression ratio is larger than the second compression ratio, compressing the target data at the first compression ratio into a plurality of data fragments; storing the plurality of data fragments into a plurality of rewrite segments in the storage area, the plurality of rewrite segments being previously used for storing corresponding fragments of the original data; and storing at least one padding data fragment into at least one free sector interleaved with the plurality of rewrite segments and/or free sectors in the plurality of rewrite segments.

In a third aspect of the present disclosure, a computer program product is provided. The computer program product is tangibly stored in a non-transitory computer storage medium, and includes machine-executable instructions that, when executed by a device, cause the device to perform acts of: comparing, based on a request of rewriting target data into a storage area to cover original data, a first compression ratio of the target data with a second compression ratio of the original data; in accordance with a determination that the first compression ratio is larger than the second compression ratio, compressing the target data at the first compression ratio into a plurality of data fragments; storing the plurality of data fragments into a plurality of rewrite segments in the storage area, the plurality of rewrite segments being previously used for storing corresponding fragments of the original data; and storing at least one padding data fragment into at least one free sector interleaved with the plurality of rewrite segments and/or free sectors in the plurality of rewrite segments.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

Throughout the drawings, the same or similar reference signs refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more details below with reference to the drawings. Although the drawings illustrate some example embodiments of the present disclosure, it should be understood that the present disclosure can be implemented in various manners and not intended to be limited to the embodiments explained herein. On the contrary, the embodiments are provided to make the present disclosure more thorough and complete and to fully convey the scope of the present disclosure to those skilled in the art.

As used herein, the term "include" and its variants are to be read as open-ended terms that mean "include, but is not limited to." The term "or" is to be read as "and/or" unless explicitly stated otherwise. The term "based on" is to be read as "based at least in part on." The terms "one example embodiment" and "one embodiment" are to be read as "at least one example embodiment." The term "another embodiment" is to be read as "at least one other embodiment." The terms "first", "second" and so on may refer to the same or different objects unless indicated otherwise. Other explicit and implicit definitions may also be presented below.

Modern storage systems (e.g., the All Flash Array (AFA) storage device) that employ the Inline Compression (ILC) technology can greatly save disk space. As previously noted, the storage area of the storage device may be divided into a plurality of storage segments based on the page size. In the case of data being overwritten into sectors within the storage area where original data are previously stored, it will not result in changes to the metadata. If the overwritten data have the same compression ratio (i.e., a ratio of data size before compression to data size after compression) as the original data, the storage space of the storage area can be fully utilized to sequentially write the overwritten data into a backend driver in a continuous manner.

However, the inventor discovers that if the overwritten data have a larger compression ratio than the original data, the originally continuous overwritten data will be stored in a discontinuous manner leaving gaps between the storage segments. A storage state of a storage area 100 in the conventional storage device is described below in details with reference to FIGS. 1A and 1B.

Figure 1A:
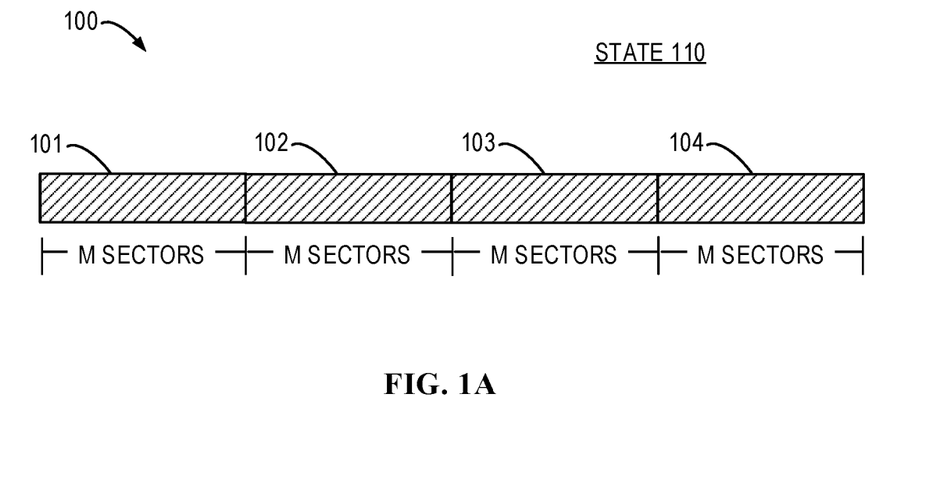
FIGS. 1A to 1B illustrate schematic diagrams of storage states of an example storage area in a conventional storage device.
Figure 1B:
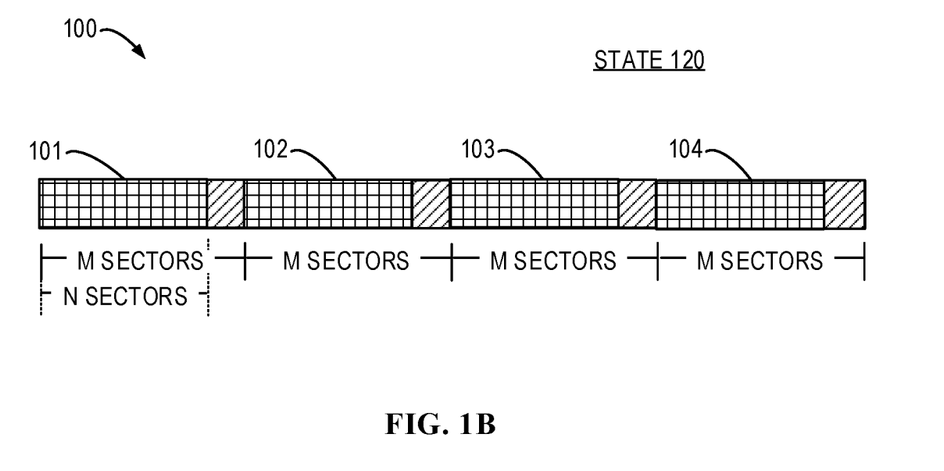

The storage area 100 includes a plurality of storage segments 101, 102, 103 and 104 which are divided based on a predetermined page size, and each of the storage segments has M sectors, as an example, M=8. The storage area may be located in any type of storage devices for storing data, I/O instructions, etc., such as the storage area in a Hard Disk (HD) or a Solid-State Disk (SSD). It should be understood that for the purpose of discussion, the storage area 100 has a page size of 8 KB as the minimum allocation unit, and only includes 4 storage segments. However, the storage area 100 may also be divided by different page sizes and include any number of storage segments.

As shown in FIG. 1A, the storage area 100 in a state 110 initially stores the original data (e.g., data fragments indicated by a diagonal pattern) which, for example are compressed at a compression ratio of 2:1 and each of the data fragments of the original data is 4 KB and stored in 8 sectors.

Subsequently, in a state 120 as shown in FIG. 1B, target data are compressed into a plurality of data fragments of 6 KB at a compression ratio of 8:3 and then overwritten into the storage area 100 to cover the original data, such as data fragments indicated by a grid pattern. Because the compression ratio of the target data is larger than that of the original data, less storage space in the storage segments, e.g., only N sectors (where N<M) is occupied by the data fragments of the target data, for example, N=6.

Accordingly, there are two-free sector gaps between the data fragments of the target data in the storage segments 101 to 104. Such a gap causes discontinuity in an operation of flush write I/O instruction. Additionally, in order to ensure that the memory is aligned with respect to the backend driver, low-level components need to spend additional overheads to read the gaps between the write I/O instructions. As a result, the storage devices, such as Redundant Array of Independent Disks (RAID), cannot take full advantage of their capability in effectively processing large continuous I/O instructions.

In accordance with the embodiments of the present disclosure, a solution for overwriting data is provided. In this solution, free sectors in the storage segments and/or free segments between adjacent storage segments are padded with padding data such that the overwritten data is stored in the storage areas in a continuous manner which generate larger continuous data, and such a continuous data are friendly to the backend driver, such as RAID, etc.

In this way, the embodiments in accordance with the present disclosure can avoid flushing the write I/O instructions in a discontinuous manner and save additional read overheads incurred by the write request, thereby improving the write performance of the storage device, for example, the Input/Output Operations Per Second (IOPS).

Figure 2:
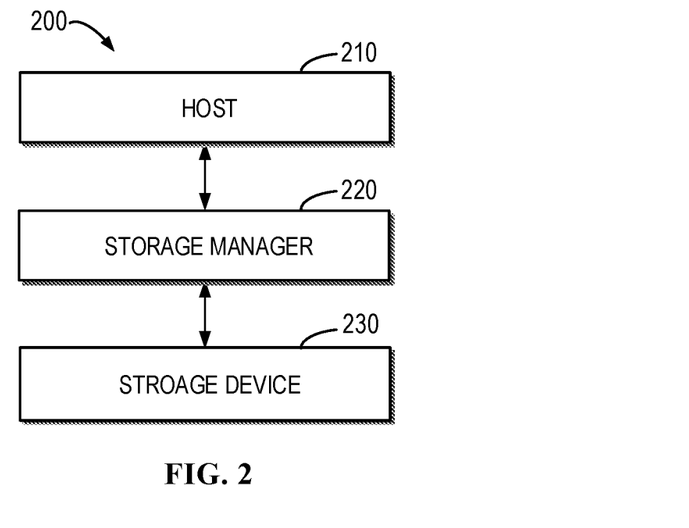
FIG. 2 illustrates a schematic diagram of an example storage area where a device and/or a method in accordance with embodiments of the present disclosure can be implemented.

The embodiments of the present disclosure are described below in further details with reference to the drawings. FIG. 2 illustrates a schematic diagram of an example environment 200 for overwriting data in accordance with the embodiments of the present disclosure. As shown in FIG. 2, the example environment 200 includes a host 210, a storage manager 220 and a storage device 230. It should be understood that the structure of the example environment 200 is described for the illustrative purpose and not intended to limit the scope of the present disclosure. For example, the embodiments of the present disclosure may also be applied to an environment different from the example environment 200.

The host 210 may be any of a physical computer, a virtual machine or a server running user applications, for example. The host 210 may send an I/O request to the storage manager 220, for reading data from the storage device 230 and/or writing data into the storage device 230, etc., for example. In response to receiving a read request from the host 210, the storage manager 220 may read data from the storage device 230 and return the data read to the host 210. In response to receiving a write request from the host 210, the storage manager 220 may write data into the storage device 230. The storage device may be any of the currently known or to be developed non-volatile storage medium, such as, disks, Solid-State Disks (SSD) or disk array (RAID) etc.

The storage manager 220 may be deployed with a compression/decompression engine (not shown). For example, upon receiving a request for writing data into the storage device 230 from the host 210, the storage manager 220 may compress the data to be stored by using the compression/decompression engine and then store the compressed data into the storage device 230.

Figure 3A:
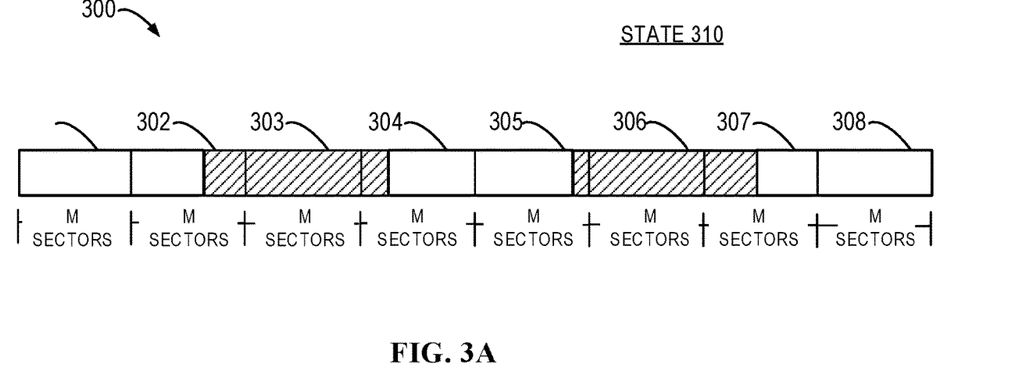
FIGS. 3A to 3C illustrate schematic diagrams of storage states of the example storage area where a device and/or a method in accordance with embodiments of the present disclosure can be implemented.
Figure 3B:
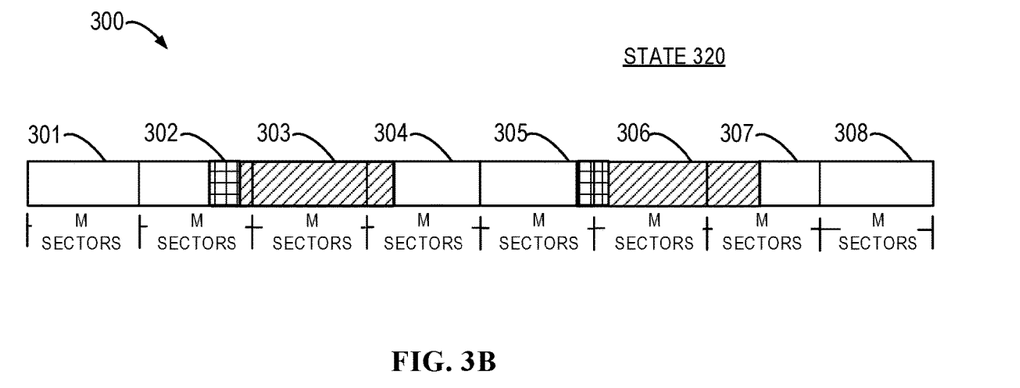
Figure 3C:
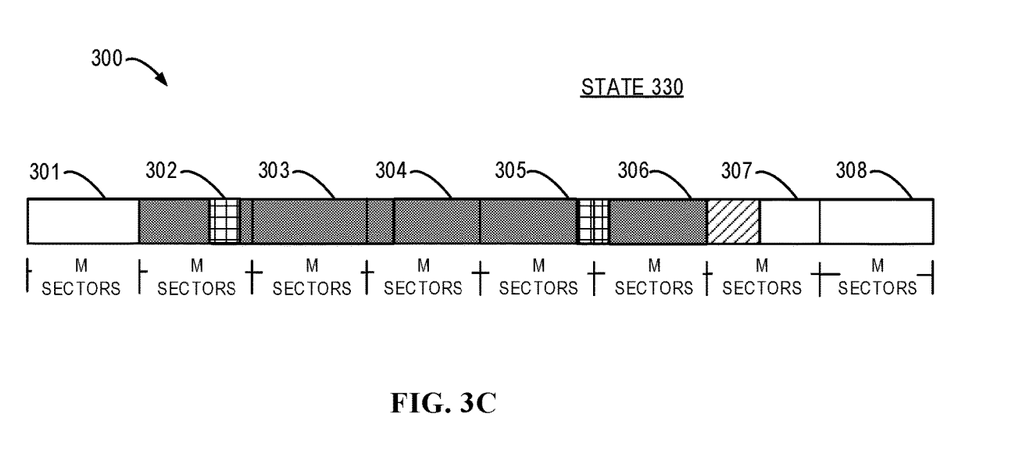

FIGS. 3A to 3C illustrate schematic diagrams of storage states of an example storage area 300 where the device and/or method in accordance with the embodiments of the present disclosure may be implemented. For example, the storage area 300 may be a storage area in the storage device 230 as shown in FIG. 2. It should be understood that the storage area 300 may also present in any other suitable storage devices and the scope of the present disclosure is not intended to be limited in this regard. FIGS. 3A to 3C are described below in details with reference to FIG. 2.

The storage area 300 is divided into a plurality of storage segments 301 to 308, based on an initial sector index and a predetermined page size (e.g., the segment length), wherein each of the storage segments includes M sectors. The storage area 300 may be a storage area in any type of storage devices (such as a Hard Disk (HD) or a Solid-State Drive (SSD)) for storing any suitable types of data (e.g., I/O instructions). It should be understood that for the purpose of discussion, the storage area 300 is illustrated as having a page size of 8 KB as its minimum allocation unit and only includes 8 storage segments to facilitate description. However, the above numbers are only illustrative, rather than restrictive and the storage area 300 may adopt different page sizes and include any number of storage segments. The present disclosure is not intended to be limited in this regard.

As shown in FIG. 3A, the storage area 300 in a state 310 initially store the original data (e.g., data fragments indicated by a diagonal pattern) which, for example are compressed at a compression ratio of 16:13 and each of the data fragments of the original data is stored in 13 sectors. In the storage area 300, the storage segments 301 and 308 are free segments having no data stored therein while in the storage segments 302, 304, 305 and 307, only a part of sectors have data stored therein and the rest sectors are free sectors.

In a state 320 as shown in FIG. 3B, the storage manager 220 compresses the target data into a plurality of data fragments of 1 KB (e.g., data fragments indicated by a grid pattern) at a compression rate of 8:1 and then overwrites them in the storage area 300 to cover the original data, with each of the data fragments occupying 2 sectors. Because the second compression ratio is higher than the first compression ratio, the data fragments of the target data occupy a smaller storage space in the storage segments, such that gaps are present between the storage segments 302 to 306.

As previously described, in order to meet the write alignment requirement of the storage device, when the storage manager 220 is reading, it also needs to read the free sectors or the free segments between the data fragments in addition to the sectors storing the target data. Accordingly, in a state 330 as shown in FIG. 3C, the storage manager 220 may store the padding data fragments (e.g., data fragments indicated by a dot pattern) in the free sectors or the free segments in the storage area 300. A detailed procedure for overwriting data in accordance with the embodiments of the present disclosure is described below with reference to FIGS. 4 to 5.

Figure 4:
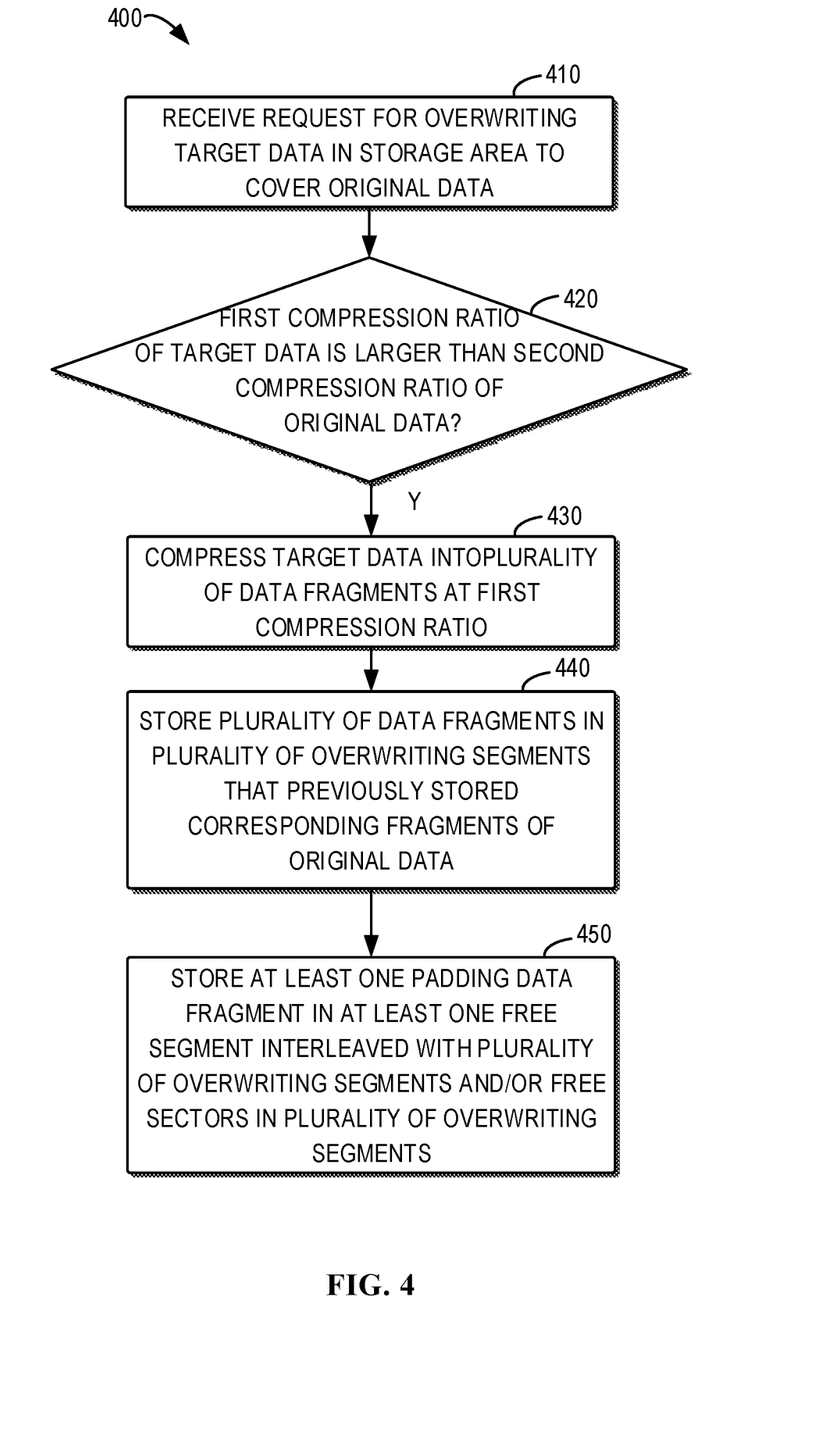
FIG. 4 illustrates a flow chart of an example method for overwriting data in accordance with embodiments of the present disclosure.

FIG. 4 illustrates a flow chart of an example method 400 for overwriting data in accordance with the embodiments of the present disclosure. For example, the method 400 may be performed by the storage manager 220 as shown in FIG. 2, or any other suitable devices. It should be understood that the method 400 may further include additional acts not shown and/or the acts shown may be omitted. The scope of the present disclosure is not intended to be limited in this regard. For the purpose of discussion, the process 400 is described below with reference to FIGS. 2 and 3A-3C.

At 410, the storage manager 220 receives a request for overwriting the target data in the storage area 300 to cover the original data. For example, the storage manager 220 may receive the request for overwriting the target data in the storage area to cover the original data from the host 210, or it may receive the request from any suitable elements. The scope of the present disclosure is not intended to be limited in this regard.

At 420, the storage manager 220 compares a first compression ratio of the target data with a second compression ratio of the original data. For example, in the examples of FIGS. 3A to 3C, the storage manager 220 compares the first compression ratio of 8:1 with the second compression ratio of 16:13 and determines that the first compression ratio is larger than the second compression ratio.

In some embodiments, if the storage manager 220 determines that the first compression ratio of the target data is smaller than or equal to the second compression ratio of the original data, the target data may be stored by using any suitable conventional storage approach, which will not be described in details.

At 430, in accordance with a determination that the first compression ratio is larger than the second compression ratio, the storage manager 220 compresses the target data into a plurality of data fragments at the first compression ratio. For example, the target data can be compressed into data fragments each is of 2 KB.

At 440, the storage manager 220 stores a plurality of data fragments of the target data in a plurality of overwriting segments of the storage area 300. In the context of the present disclosure, the overwriting segment is a storage segment which is previously used for storing corresponding fragments of the original data and may be used to overwrite the target data. The overwriting segments, for example, may be storage segments 302, 305 and 306 as shown in FIGS. 3A-3C.

At 450, the storage manager 220 stores at least one padding data fragment in at least one free segment interleaved with a plurality of overwriting segments 302, 305 and 306 and/or the free sectors in the plurality of overwriting segments.

As shown in FIG. 3C, the storage manager 220 may store the padding data fragments in the free segments 303 and 304 interleaved with the overwriting segments 302, 305 and 306. In the context of the present disclosure, the free segment refers to a storage segment in which none of the sectors stores any target data. Additionally, the storage manager 220 may also store the padding data fragments in the free sectors in the overwriting segments 302, 305 and 306.

As such, the free segments 303 and 304 and/or the free sectors of the overwriting segments 302, 305 and 306 in the storage area 300 are padded with the padding data fragments, such that the originally discontinuous target data now become larger continuous data occupying the storage segments 302 to 306 while the write alignment requirement of the storage device is also satisfied.

Figure 5:
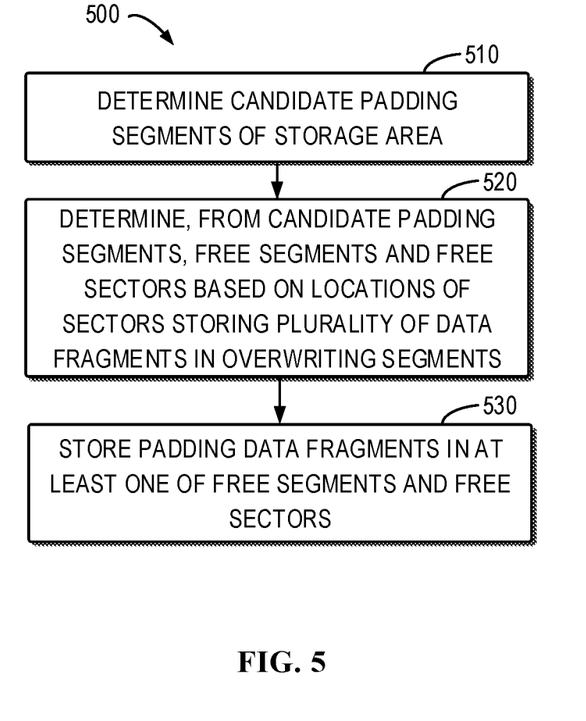
FIG. 5 illustrates a flow chart of a method for determining storage locations of padding data fragments in accordance with embodiments of the present disclosure.

FIG. 5 illustrates a flow chart of a method 500 for determining storage locations of the padding data fragments in accordance with the embodiments of the present disclosure. For example, the method 500 may be performed by the storage manager 220 as shown in FIG. 2 or any other suitable devices. It should be understood that the method 500 may further include additional acts not shown and/or the acts shown may be omitted. The scope of the present disclosure is not intended to be limited in this regard. It will be appreciated that the method 500 is an example implementation of the step 450 in the method 400. For the purpose of discussion, the process 500 is described below with reference to FIGS. 2 and 3A-3C.

As shown in FIG. 5, at 510, the storage manager determines candidate padding segments 302 to 306 of the storage area 300. In some embodiments, the storage manager 220 may generate a first bitmap indicative of writability of a segment for the storage segments 301-308 of the storage area 300. The first bitmap includes a plurality of bits corresponding to respective sectors in the storage segments, wherein bit 0 indicates an unwritable sector and bit 1 indicates a sector that stores overwritten data and original data or a free sector. In the examples illustrated in FIGS. 3A to 3C, for the storage segments 301 to 308, their first bitmaps each include 8 bits, and are 11111111. In the embodiments of the present disclosure, if not all the bits in the first bitmap of a corresponding storage segment is 1, it indicates that the storage segment is unwritable. Accordingly, the storage manager 220 may determine, based on the first bitmaps of the respective storage segments, the storage segments 301 to 308 except for the unwritable ones as the candidate padding segments.

The storage segments 301, 307 and 308 store no target data and thus may not be padded from the perspective of memory loss. In some embodiments, the storage manager 220 may generate second bitmaps indicative of writability of a sector for the storage segments 301-308 of the storage area 300, which are. The second bitmap includes a plurality of bits corresponding to respective sectors in the storage segments, wherein bit 0 indicates a sector that stores the original data, a free sector or an unwritable sector and bit 1 indicates a sector that stores overwritten data. For example, the second bitmap for the storage segment 301 is 00000000 while the second bitmap for the storage segment 302 is 00000110. In the embodiments of the present disclosure, if the first bitmap of a corresponding storage segment is full of bit 1 and its second bitmap is not full of bit 0, it indicates that the storage segment is an overwriting segment. If the first bitmap of the corresponding storage segment is full of 1 and the second bitmap is full of 0, it indicates that the storage segment is a free segment. For example, in the state 320 as shown in FIG. 3B, the storage segments 302, 305 and 306 are overwriting segments while the storage segments 301, 303, 304, 307 and 308 are free segments.

In some embodiments, the storage manager 220 may determine, based on the first bitmap and the second bitmap, a starting overwriting segment 302 and an ending overwriting segment 306 located in the overwriting segments 302, 305 and 306. For example, the storage manager 220 may determine, based on the first bitmaps and the second bitmaps of a plurality of storage segments 301 to 308 in the storage area 300, the storage segment 302 as the starting overwriting segment and the storage segment 306 as the ending overwriting segment, where the storage segment 302 has a top address index with its first bitmap being full of bit 1 and its second bitmap being not full of bit 0 while the storage segment 306 has a bottom address index with its first bitmap being full of bit 1 and its second bitmap being not full of bit 0. The storage manager 220 may then further determine that the storage segments between the starting overwriting segment 302 and the ending overwriting segment 306 as the candidate storage segments, e.g., the storage segments 302 to 306.

At 520, the storage manager 220 determines, from the determined candidate padding segments 302 to 306, the free segments 303 and 304 and the free sectors in the overwriting segments 302, 305 and 306, based on locations of sectors storing data fragments of the target data in the overwriting segments 302, 305 and 306.

In some embodiments, the storage manager 220 may determine corresponding sectors having a bit value of 1 as the sectors having the data fragments stored therein, based on the second bitmaps of the respective candidate padding segments. Then, the rest sectors, except for those storing the data fragments, in the overwriting segments 302, 305 and 306 are determined as the free sectors and the storage segments except for the overwriting segments in the candidate padding segments, such as the storage segments 303 and 304, are determined as the free segments.

At 530, the storage manager 220 stores the padding data fragments in at least one of the free segments 303 and 304 and the free sectors of the overwriting segments 302, 305 and 306. For example, in the state 330 as shown in FIG. 3C, the storage manager 220 stores the padding data fragments in the free segments 303 and 304 interleaved with the overwriting segments 302, 305 and 306 and in the free sectors in the overwriting segments 302, 305 and 306, so as to form the continuous target data from the storage segments 302 to 306. The target data also satisfy the write alignment requirement of the storage device. It should be understood that the padding data fragments may or may not be identical to the target data, and the scope of the present disclosure is not intended to be limited in this regard.

Additionally, given that the padding data do not include the overwritten target data, it may be undesirable that too many free segments are occupied by the padding data fragments from the perspective of the memory loss level. In some embodiments, the storage manager 220 may further determine a ratio of the number of the free segments to the number of the candidate padding segments. For example, in the state 320 as shown in FIG. 3B, the ratio of the number of the free segments to the number of the candidate padding segments is 2:5. Then, the storage manager 220 compares the ratio of the number of the free segments to the number of the candidate padding segments with a threshold, e.g., 1/2. If the ratio does not exceed the threshold 1/2, it may indicate that the memory loss level will not be affected by padding the free segments and/or free sectors with the padding data fragments. Accordingly, the storage manager 220 may generate the padding data fragments and store them in at least one of the free segments and the free sectors. In contrast, if the ratio exceeds the predetermined threshold, it may indicate that padding the free segments and/or free sectors with the padding data fragments may undermine the memory loss level. Therefore, the storage manager 220 may not pad at least one of the free segments and the free sectors.

In some embodiments, the storage manager 220 may further determine whether an unwritable segment is present between two adjacent overwriting segments. For example, if a storage segment with its first bitmap including bit 0 presents between any two adjacent overwriting segments, it may be determined that an unwritable segment is present between the two adjacent overwriting segments.

In accordance with the embodiments of the present disclosure, a solution for overwriting data is provided. This solution can store the overwritten data in the storage areas in a continuous manner while satisfy the write alignment requirement of the storage device, thereby saving the additional read overheads incurred by the write request and significantly improving the read/write performance of the storage device.

Figure 6:
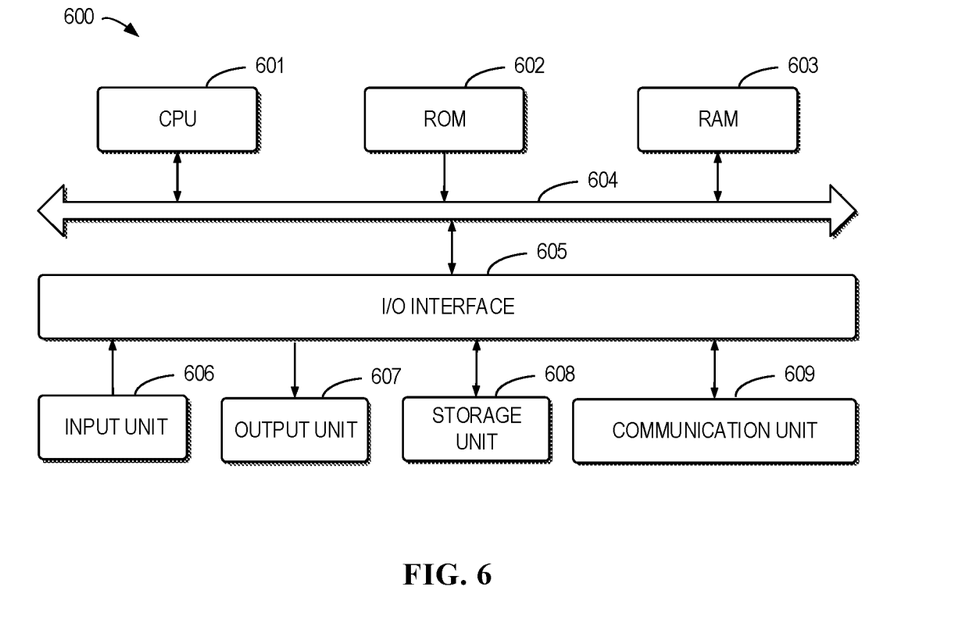
FIG. 6 illustrates a schematic diagram of an example device that can be used to implement embodiments of the present disclosure.

FIG. 6 illustrates a schematic block diagram of an example device 600 which may be used for implementing embodiments of the present disclosure. For example, the example device 200 shown in FIG. 2 may be implemented by the device 600. As shown, the device 600 includes a central processing unit (CPU) 601, which can execute various suitable acts and processing based on computer program instructions stored in a read-only memory (ROM) 602 or based on computer program instructions loaded into a random-access memory (RAM) 603 from a storage unit 608. The RAM 603 may also store various programs and data required by operations of the device 600. The CPU 601, ROM 602 and RAM 603 are connected to each other via a bus 604. An input/output (I/O) interface 605 is also connected to the bus 604.

A plurality of components in the device 600 are connected to the I/O interface 605, including: an input unit 606, such as a keyboard, a mouse and the like; an output unit 607, e.g., various types of displays and loudspeakers etc.; a storage unit 608, such as a magnetic disk, an optical disk, etc.; and a communication unit 609, such as a network card, a modem, a wireless communication transceiver and the like. The communication unit 609 allows the device 600 to exchange information/data with other devices via the computer network, such as Internet, and/or various telecommunication networks.

Various procedures and processing described above, e.g., the methods 400 and 500, may be performed by the processing unit 601. For example, in some embodiments, the methods 400 and 500 may be implemented as a computer software program that is tangibly embodied on a machine-readable medium, e.g., the storage unit 608. In some embodiments, a part of or the entire computer program may be loaded and/or mounted onto the device 600 via the ROM 602 and/or the communication unit 609. When the computer program is loaded to the RAM 603 and executed by the CPU 601, one or more acts of the method 600 as described above can be implemented.

The present disclosure may be a method, an apparatus, a system and/or a computer program product. The computer program product may include a computer-readable storage medium, on which the computer-readable program instructions for performing various aspects of the present disclosure are carried.

The computer-readable storage medium may be a tangible apparatus that maintains and stores instructions to be used by an instruction executing device. The computer-readable storage medium may be, but not limited to, electrical storage device, magnetic storage device, optical storage device, electromagnetic storage device, semiconductor storage device or any suitable combinations of the above. More specific examples (a non-exhaustive list) of the computer-readable storage medium may include: portable computer disk, hard disk, random-access memory (RAM), read-only memory (ROM), erasable programmable read-only memory (EPROM or flash memory), static random-access memory (SRAM), portable compact disk read-only memory (CD-ROM), digital versatile disk (DVD), memory stick, floppy disk, mechanical coding device, punch card or in-slot-projection having instructions stored thereon, and any suitable combinations of the above. The computer-readable storage medium as used herein should not be interpreted as transitory signals per se, such as radio waves or other freely propagated electromagnetic waves, electromagnetic waves propagated via a waveguide or other transmission media (e.g., optical pulses via a fiber-optic cable), or electric signals propagated via a wire.

The computer-readable program instructions described herein may be downloaded from a computer-readable storage medium to various computing/processing devices, or to an external computer or external storage device via a network, such as Internet, a local area network, a wide area network and/or a wireless network. The network may include copper transmission cable, optical fiber transmission, wireless transmission, router, firewall, switch, gateway computer and/or edge server. A network adapter card or a network interface in each computing/processing device receives computer-readable program instructions from the network and forwards the computer-readable program instructions for storage in the computer-readable storage medium in respective of each computing/processing devices.

The computer program instructions for performing operations of the present disclosure may be assembly instructions, instructions in instruction set architecture (ISA), machine instructions, machine-related instructions, microcodes, firmware instructions, state setting data, or source codes or target codes written in any combination of one or more programming languages, including object-oriented programming languages, such as Smalltalk, C++ and the like, and traditional procedural programming languages, such as, "C" language or similar programming languages. The computer-readable program instructions may be executed entirely on the user's computer, be executed partially on the user's computer, as a stand-alone software package, be executed partially on the user's computer and partially on a remote computer or be executed entirely on a remote computer or server. In the case where the remote computer is involved, the remote computer may be connected to the user's computer via any type of networks, including a local area network (LAN) and wide area network (WAN), or to the external computer (e.g., connected via Internet using the Internet service provider). In some implementations, an electronic circuitry, such as a programmable logic circuitry, a field programmable gate array (FPGA) or a programmable logic array (PLA), may be customized by using state information of the computer-readable program instructions. The electronic circuitry may execute computer-readable program instructions to implement various aspects of the present disclosure.

Various aspects of the present disclosure are disclosed herein with reference to the flow charts and/or block diagrams of the method, apparatus (system) and computer program product according to the embodiments of the present disclosure. It should be understood that each of blocks of the flow charts and/or block diagrams and combinations thereof may be implemented by the computer-readable program instructions.

The computer-readable program instructions may be provided to a processing unit of a general purpose computer, a special purpose computer or other programmable data processing apparatus to produce a machine, such that the instructions, when executed by the processing unit of the computer or by the other programmable data processing apparatus, produce means (e.g., specialized circuitry) for implementing functions/acts specified in one or more of blocks in the flow charts and/or block diagrams. The computer-readable program instructions may also be stored in a computer-readable storage medium and the instructions cause a computer, a programmable data processing apparatus and/or other devices to operate in a particular manner. Therefore, the computer-readable medium having instructions stored thereon includes an article of manufacture that includes instructions for implementing various aspects of the functions/acts specified in one or more of blocks of the flow charts and/or block diagrams.

The computer-readable program instructions may also be loaded onto the computer, other programmable apparatuses or other device to cause a series of operational steps to be performed on the computer, the other programmable apparatus or the other device to produce a computer-implemented process, such that the instructions executed on the computer, the other programmable apparatus or the other device implement the functions/acts specified in one or more of blocks of the flow charts and/or block diagrams.

The flow chart and block diagram in the drawings illustrate the architecture, functions and operations of possible implementations of systems, methods and computer program products according to the embodiments of the present disclosure. In this regard, each block in the flow charts or block diagrams may represent a module, snippet, or portion of instructions, which includes one or more executable instructions for performing the specified logic function(s). In some alternative implementations, the functions indicated in the block may also occur out of the order indicated in the figures. For example, two blocks shown in succession may, in fact, be executed in parallel or the blocks may sometimes be executed in a reverse order depending upon the functionalities involved. It should also be noted that each block in the block diagrams and/or flow charts and combinations thereof may be implemented by a special purpose hardware-based system that performs the specified functions or actions, or combinations of special purpose hardware and computer instructions.

Various implementations of the present disclosure have been described above and the above description is only illustrative rather than exhaustive and is not limited to the implementations of the present disclosure. Many modifications and alterations will be apparent to those of ordinary skills in the art without departing from the scope and spirit of the described implementations. The terminology used herein was chosen to best explain the principles of the embodiments, the practical applications or technical improvements over technologies found in the marketplace, or to enable others of ordinary skilled in the art to understand the embodiments disclosed herein.

We claim:

1. A method for overwriting data, comprising:
    comparing, based on a request for overwriting target data in a storage area to cover original data, a first compression ratio of the target data with a second compression ratio of the original data;
    in accordance with a determination that the first compression ratio is larger than the second compression ratio, compressing the target data into a plurality of data fragments at the first compression ratio;
    storing the plurality of data fragments in a plurality of overwriting segments in the storage area, the plurality of overwriting segments being previously used for storing corresponding fragments of the original data; and
    storing at least one padding data fragment in at least one free segment interleaved with the plurality of overwriting segments and/or free sectors in the plurality of overwriting segments,
    wherein storing at least one padding data fragment in at least one free segment interleaved with the plurality of overwriting segments and/or free sectors in the plurality of overwriting segments comprises:
        (1) determining candidate padding segments of the storage area;
        (2) determining, from the determined candidate padding segments, the at least one free segment and the free sectors based on locations of sectors storing the plurality of data fragments in the overwriting segments; and
        (3) storing the padding data fragments in at least one of the at least one free segment and the free sectors,
    and wherein storing the padding data fragments in at least one of the at least one free segment and the free sectors comprises:
        (1) determining a ratio of a number of the at least one free segment to a number of the candidate padding segments;
        (2) comparing the ratio with a predetermined threshold; and
        (3) in accordance with a determination that the ratio does not exceed the predetermined threshold, storing the padding data fragments in at least one of the at least one free segment and the free sectors.

2. The method of claim 1, wherein determining candidate padding segments of the storage area comprises:
    generating a first bitmap indicative of writability of a segment in the storage area;
    determining, based on the first bitmap, an unwritable segment of the storage area; and
    determining segments except for the unwritable segment of the storage area as the candidate padding segments.

3. The method of claim 1, wherein determining the at least one free segment and the free sectors comprises:
    generating a second bitmap indicative of overwritability of a sector in the candidate padding segments;
    determining, based on the second bitmap, sectors where the data fragments are stored;
    determining sectors except for the sectors where the data fragments are stored in the overwriting segments as the free sectors; and
    determining segments except for the overwriting segments in the candidate padding segments as the at least one free segment.

4. The method of claim 1, wherein the at least one free segment interleaved with the plurality of overwriting segments is positioned between a starting overwriting segment and an ending overwriting segment of the plurality of overwriting segments.

5. The method of claim 1, wherein the storage area is divided into a plurality of segments based on a starting sector index and a segment length of the storage area.

6. The method of claim 1, wherein the padding data fragments are different from the data fragments.

7. The method of claim 1, wherein storing at least one padding data fragment in at least one free segment interleaved with the plurality of overwriting segments or free sectors in the plurality of overwriting segments comprises: storing the at least one padding data fragment in the at least one free segment between the starting overwriting segment and the ending overwriting segment of the plurality of overwriting segments and/or in the free sectors of the plurality of overwriting segments, such that the plurality of data fragments are continuous.

8. A device for storing data, comprising:
   at least one processing unit;
   at least one memory coupled to the at least one processing unit and having instructions to be executed by the at least one processing unit stored thereon, the instructions, when executed by the at least one processing unit, causing the device to perform acts comprising:
   comparing, based on a request for overwriting target data in a storage area to cover original data, a first compression ratio of the target data with a second compression ratio of the original data;
   in accordance with a determination that the first compression ratio is larger than the second compression ratio, compressing the target data into a plurality of data fragments at the first compression ratio;
   storing the plurality of data fragments in a plurality of overwriting segments in the storage area, the plurality of overwriting segments being previously used for storing corresponding fragments of the original data; and
   storing at least one padding data fragment in at least one free sector interleaved with the plurality of overwriting segments and/or free sectors in the plurality of overwriting segments,
   wherein storing at least one padding data fragment in at least one free segment interleaved with the plurality of overwriting segments and/or free sectors in the plurality of overwriting segments comprises:
      (1) determining candidate padding segments of the storage area;
      (2) determining, from the determined candidate padding segments, the at least one free segment and the free sectors based on locations of sectors storing the plurality of data fragments in the overwriting segments; and
      (3) storing the padding data fragments in at least one of the at least one free segment and the free sectors,
   and wherein storing the padding data fragments in at least one of the at least one free segment and the free sectors comprises:
      (1) determining a ratio of a number of the at least one free segment to a number of the candidate padding segments;
      (2) comparing the ratio with a predetermined threshold; and
      (3) in accordance with a determination that the ratio does not exceed the predetermined threshold, storing the padding data fragments in at least one of the at least one free segment and the free sectors.

9. The device of claim 8, wherein determining candidate padding segments of the storage area comprises:
   generating a first bitmap indicative of writability of a segment in the storage area;
   determining, based on the first bitmap, an unwritable segment of the storage area; and
   determining segments except for the unwritable segment of the storage area as the candidate padding segments.

10. The device of claim 8, wherein determining the at least one free segment and the free sectors comprises:
   generating a second bitmap indicative of overwritability of a sector in the candidate padding segments;
   determining, based on the second bitmap, sectors where the data fragments are stored;
   determining sectors except for the sectors where the data fragments are stored in the overwriting segments as the free sectors; and
   determining segments except for the overwriting segments in the candidate padding segments as the at least one free segment.

11. The device of claim 8, wherein the at least one free segment interleaved with the plurality of overwriting segments is positioned between a starting overwriting segment and an ending overwriting segment of the plurality of overwriting segments.

12. The device of claim 8, wherein the storage area is divided into a plurality of segments based on a starting sector index and a segment length of the storage area.

13. The device of claim 8, wherein the padding data fragments are different from the data fragments.

14. The device of claim 8, wherein storing at least one padding data fragment in at least one free segment interleaved with the plurality of overwriting segments or free sectors in the plurality of overwriting segments comprises: storing the at least one padding data fragment in the at least one free segment between the starting overwriting segment and the ending overwriting segment of the plurality of overwriting segments and/or in the free sectors of the plurality of overwriting segments, such that the plurality of data fragments are continuous.

15. A computer program product having a non-transitory computer readable medium which stores a set of instructions to overwrite data; the set of instructions, when carried out by computerized circuitry, causing the computerized circuitry to perform a method of:
   comparing, based on a request for overwriting target data in a storage area to cover original data, a first compression ratio of the target data with a second compression ratio of the original data;
   in accordance with a determination that the first compression ratio is larger than the second compression ratio, compressing the target data into a plurality of data fragments at the first compression ratio;
   storing the plurality of data fragments in a plurality of overwriting segments in the storage area, the plurality of overwriting segments being previously used for storing corresponding fragments of the original data; and
   storing at least one padding data fragment in at least one free segment interleaved with the plurality of overwriting segments and/or free sectors in the plurality of overwriting segments,
   wherein storing at least one padding data fragment in at least one free segment interleaved with the plurality of overwriting segments and/or free sectors in the plurality of overwriting segments comprises:
      (1) determining candidate padding segments of the storage area;
      (2) determining, from the determined candidate padding segments, the at least one free segment and the free sectors based on locations of sectors storing the plurality of data fragments in the overwriting segments; and (3) storing the padding data fragments in at least one of the at least one free segment and the free sectors, and wherein storing the padding data fragments in at least one of the at least one free segment and the free sectors comprises:
  (1) determining a ratio of a number of the at least one free segment to a number of the candidate padding segments;
  (2) comparing the ratio with a predetermined threshold; and
  (3) in accordance with a determination that the ratio does not exceed the predetermined threshold, storing the padding data fragments in at least one of the at least one free segment and the free sectors.

16. The computer program product of claim 15, wherein determining candidate padding segments of the storage area comprises:
  generating a first bitmap indicative of writability of a segment in the storage area;
  determining, based on the first bitmap, an unwritable segment of the storage area; and
  determining segments except for the unwritable segment of the storage area as the candidate padding segments.

17. The computer program product of claim 15, wherein determining the at least one free segment and the free sectors comprises:
  generating a second bitmap indicative of overwritability of a sector in the candidate padding segments;
  determining, based on the second bitmap, sectors where the data fragments are stored;
  determining sectors except for the sectors where the data fragments are stored in the overwriting segments as the free sectors; and
  determining segments except for the overwriting segments in the candidate padding segments as the at least one free segment.

18. The computer program product of claim 15, wherein the at least one free segment interleaved with the plurality of overwriting segments is positioned between a starting overwriting segment and an ending overwriting segment of the plurality of overwriting segments.

19. The computer program product of claim 15, wherein the storage area is divided into a plurality of segments based on a starting sector index and a segment length of the storage area.

20. The computer program product of claim 15, wherein storing at least one padding data fragment in at least one free segment interleaved with the plurality of overwriting segments or free sectors in the plurality of overwriting segments comprises: storing the at least one padding data fragment in the at least one free segment between the starting overwriting segment and the ending overwriting segment of the plurality of overwriting segments and/or in the free sectors of the plurality of overwriting segments, such that the plurality of data fragments are continuous.

* * * * *